United States Patent
Liu et al.

(10) Patent No.: US 10,328,497 B1
(45) Date of Patent: Jun. 25, 2019

(54) WHEEL SPRAYING PROTECTION DEVICE

(71) Applicant: CITIC Dicastal CO., LTD., Qinhuangdao, Hebei (CN)

(72) Inventors: Huiying Liu, Qinhuangdao (CN); Long Yang, Qinhuangdao (CN)

(73) Assignee: CITIC Dicastal CO., LTD., Qinhuangdao, Hebei (CN)

( * ) Notice: Subject to any disclaimer, the term of this patent is extended or adjusted under 35 U.S.C. 154(b) by 0 days.

(21) Appl. No.: 15/894,058

(22) Filed: Feb. 12, 2018

(30) Foreign Application Priority Data

Dec. 25, 2017 (CN) .......................... 2017 1 1417006

(51) Int. Cl.
| | |
|---|---|
| *B05B 12/26* | (2018.01) |
| *B05B 13/02* | (2006.01) |
| *B05C 13/02* | (2006.01) |
| *B23B 31/28* | (2006.01) |
| *B05B 12/32* | (2018.01) |
| *B60C 25/00* | (2006.01) |

(52) U.S. Cl.
CPC .............. *B23B 31/28* (2013.01); *B05B 12/26* (2018.02); *B05B 12/32* (2018.02); *B05B 13/0285* (2013.01); *B05C 13/02* (2013.01); *B23B 2231/28* (2013.01); *B60C 25/00* (2013.01)

(58) Field of Classification Search
None
See application file for complete search history.

(56) References Cited

U.S. PATENT DOCUMENTS

| 4,723,563 A | * | 2/1988 | Kane | ................... B60C 25/0596 |
| | | | | 118/320 |
| 2001/0042602 A1 | * | 11/2001 | Corghi | ................ B60C 25/0545 |
| | | | | 157/14 |
| 2006/0258030 A1 | * | 11/2006 | Koeda | ................... C23C 14/042 |
| | | | | 118/715 |
| 2007/0205207 A1 | * | 9/2007 | Dornbach | ............. B05B 15/656 |
| | | | | 118/505 |
| 2011/0247551 A1 | * | 10/2011 | Malone | ................. B05C 21/005 |
| | | | | 118/505 |
| 2014/0212586 A1 | * | 7/2014 | Gephart | ................... B05C 13/02 |
| | | | | 118/500 |
| 2015/0273493 A1 | * | 10/2015 | Xue | ........................ B05C 13/02 |
| | | | | 239/224 |
| 2016/0353873 A1 | * | 12/2016 | Xue | ....................... A46B 13/02 |

* cited by examiner

*Primary Examiner* — Binu Thomas
(74) *Attorney, Agent, or Firm* — Cooper Legal Group, LLC

(57) ABSTRACT

A wheel spraying protection device is composed of a hollow mounting rack, an electric cylinder, a tray, an electromagnetic chuck, a sleeve, a piston, a soft rubber cover, a support column, an end cover, high temperature resistant plastic protective plugs, springs and iron posts. The device can play a role in protecting during a wheel spraying process, and solves the problem that a flange face, a center hole and bolt hole conical surfaces are adhered with paint. The device has the characteristics of advanced process, easiness in manufacturing, simple structure, strong function and the like.

1 Claim, 3 Drawing Sheets

WHEEL SPRAYING PROTECTION DEVICE

CROSS-REFERENCE TO RELATED APPLICATIONS

This application is filed based upon and claims priority to Chinese Patent Application No. 201711417006.9, filed on Dec. 25, 2017, the contents of which are hereby incorporated by reference in its entirety.

BACKGROUND

When paint is sprayed to a wheel, it requires no paint on a center hole, a flange mounting face and bolt hole mounting conical surfaces, so these parts must be protected during spraying. At present, the flange face is usually fitted with a tray by means of self weight of the wheel to protect the flange face, the center hole is protected by adopting a spring cone or an expansion sleeve, plastic plugs are directly put into bolt holes to protect the bolt hole conical surfaces, and such protection methods have many disadvantages in actual production: (1) the flange face of the wheel cannot be completely fitted with the tray by means of self weight of the wheel only, the wheel may rotate at a low speed and move forward during spraying, and the wheel slightly shakes and moves, thus not only causing the defect that the flange face is adhered with the paint, but also causing non-uniform thickness of a film sprayed on the wheel; (2) the wheel cannot be stable by adopting the spring cone to protect the center hole, the fixation problem of the wheel is solved by adopting the expansion sleeve to protect the center hole, but the stroke of the expansion sleeve is limited, and expansion sleeves having many specifications are needed in actual production, so the manufacturing cost is increased; and (3) when the plastic plugs are directly put into bolt holes to protect the bolt hole conical surfaces, the plastic plugs cannot be ensured to completely fit the bolt hole conical surfaces, the defect that the bolt hole conical surfaces are adhered with the paint easily appears to cause customer complaints, and when the spraying is completed, the plastic plugs are unlikely to take out from the bolt holes. Based on the current situation, this patent provides a brand-new wheel spraying protection device, which can eliminate all above disadvantages and solve the problem that the flange face, the center hole and the bolt hole conical surfaces are adhered with the paint.

SUMMARY

The disclosure relates to the technical field of wheel spraying protection, and specifically, to a device capable of protecting a center hole, a flange face and bolt hole conical surfaces of a wheel.

A wheel spraying protection device is provided, which plays a role in protecting during a wheel spraying process and solves the problem that a flange face, a center hole and bolt hole conical surfaces are adhered with paint. The device has the characteristics of advanced process, easiness in manufacturing, simple structure, strong function and the like.

In some embodiments of the disclosure, a wheel spraying protection device is composed of a hollow mounting rack, an electric cylinder, a tray, an electromagnetic chuck, a sleeve, a piston, a soft rubber cover, a support column, an end cover, high temperature resistant plastic protective plugs, springs and iron posts.

The hollow mounting rack is used for mounting the device on an automatic spraying line, the tray is mounted above the hollow mounting rack and fixed via reinforcing ribs, the electromagnetic chuck is embedded into the tray, the electric cylinder is fixed inside the hollow mounting rack, the output end of the electric cylinder is connected with the piston, the piston is matched with the inner wall of the sleeve, the outer wall of the sleeve is in tight fit with the hollow mounting rack, the tray and the electromagnetic chuck, the upper end face of the sleeve is connected with the electromagnetic chuck via screws, and the sleeve is thus fixed. The lower end of the support column is fixed on the sleeve, the upper end of the support column is fixed on the end cover, the space formed by the end cover and the sleeve is sealed by the soft rubber cover, and the medium in the sleeve is air.

When the electric cylinder propels the piston to move up, the closed space in the sleeve is reduced, the soft rubber cover is expanded by air extrusion, and the expanded soft rubber cover is in tight fit with the inner wall of a center hole of a wheel to protect the center hole; when the electric cylinder propels the piston to move down, the closed space in the sleeve is enlarged, and the soft rubber cover can contract, leave the inner wall of the center hole and restore to the initial state. Compared with a method of protecting the center hole by an expansion sleeve, this protection method is large in protection range and strong in universality and greatly reduces the manufacturing cost.

The upper end of the spring is fixed on the high temperature resistant plastic protective plug, and the lower end is free. During protection, the lower end face of the spring is in contact with the bottom surface of a bolt hole counter bore of the wheel, and when the conical surface of the high temperature resistant plastic protective plug is fitted with the conical surface of a bolt hole, the spring is in a compressed state. The iron post is fixed at the lower end of the high temperature resistant plastic protective plug.

The using method of the wheel spraying protection device is: firstly, a wheel is put on the device, the electric cylinder is started to drive the piston to move up, the soft rubber cover is expanded to protect the center hole of the wheel; then, the electromagnetic chuck is powered on, the high temperature resistant plastic protective plug is put into a bolt hole and pressed with certain strength, and when the conical surface of the high temperature resistant plastic protective plug is in tight fit with the conical surface of the bolt hole, the spring is in a compressed state; due to the suction of the electromagnetic chuck, the iron post is in tight fit with the electromagnetic chuck; after all the high temperature resistant plastic protective plugs are put into the bolt holes, the wheel is firmly fixed on the electromagnetic chuck, at the moment, not only is the flange face of the wheel completely fitted with the plane of the electromagnetic chuck, but also the conical surfaces of the high temperature resistant plastic protective plugs are in tight fit with the bolt hole conical surfaces, so that the flange face and the bolt holes conical surfaces are protected. This protection method can fulfill the purpose of tight fit, and can also solve the problem that the wheel slightly shakes and moves. After the wheel is sprayed, the soft rubber cover is contacted and restored, the electromagnetic chuck is powered off, and the high temperature resistant plastic protective plugs are easily taken out of the bolt holes under the action of elasticity of the springs, thereby solving the problem that the protective plugs are unlikely to take out due to paint adhesion.

The disclosure can play a role in protecting during the wheel spraying process, and solves the problem that the flange face, the center hole and the bolt hole conical surfaces are adhered with paint. The device has the characteristics of advanced process, easiness in manufacturing, simple structure, strong function and the like.

Figure 1:
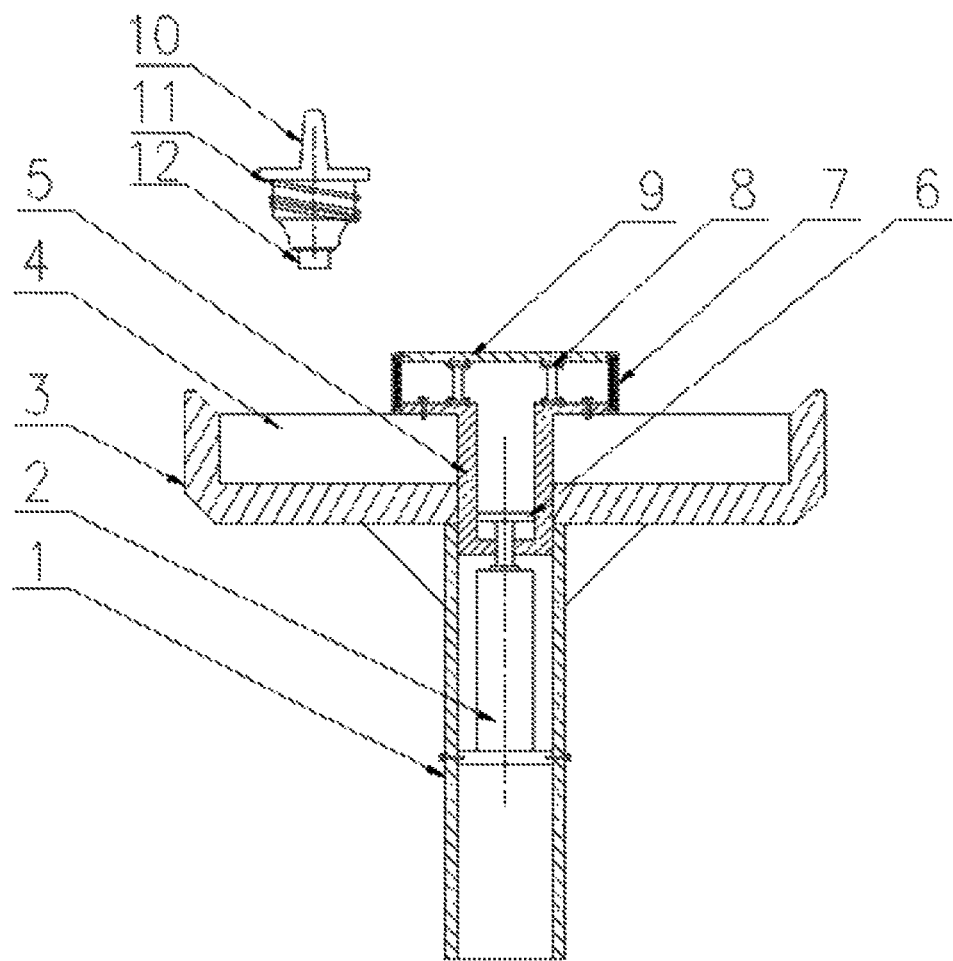
FIG. 1 is a front view of a wheel spraying protection device of the disclosure.
Figure 2:
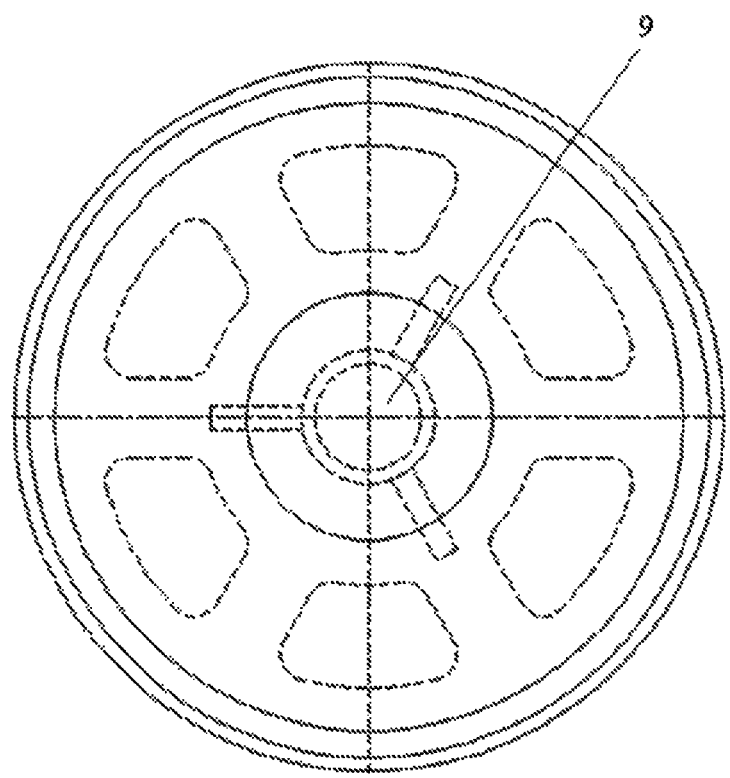
FIG. 2 is a top view of the wheel spraying protection device of the disclosure.
Figure 3:
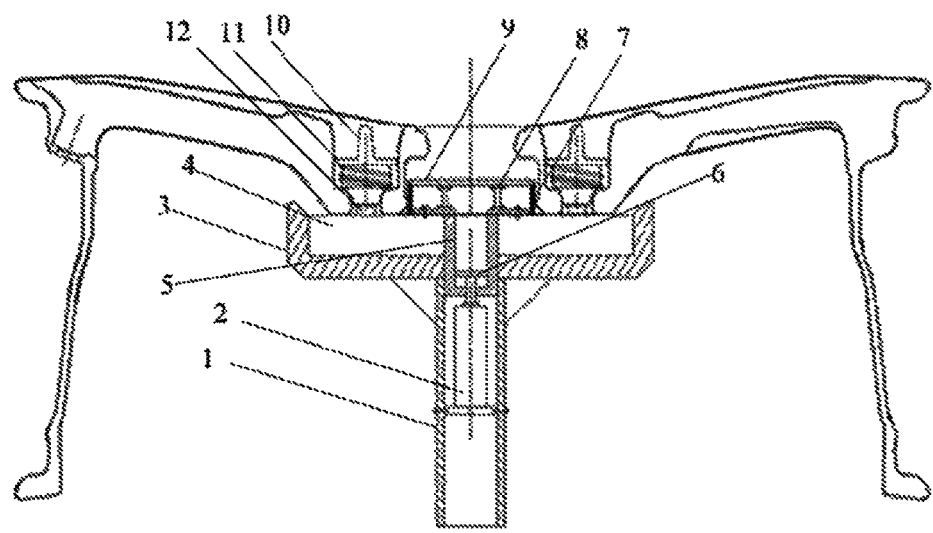
FIG. 3 is a schematic diagram of the wheel spraying protection device of the disclosure during protection.

In which, 1—hollow mounting rack, 2—electric cylinder, 3—tray, 4—electromagnetic chuck, 5—sleeve, 6—piston, 7—soft rubber cover, 8—support column, 9—end cover, 10—high temperature resistant plastic protective plug, 11—spring, 12—iron post.

DETAILED DESCRIPTION

Details and working conditions of the specific device provided by the disclosure will be given below in combination with the accompanying drawings.

A wheel spraying protection device is composed of a hollow mounting rack 1, an electric cylinder 2, a tray 3, an electromagnetic chuck 4, a sleeve 5, a piston 6, a soft rubber cover 7, a support column 8, an end cover 9, high temperature resistant plastic protective plugs 10, springs 11 and iron posts 12.

The hollow mounting rack 1 is used for mounting the device on an automatic spraying line, the tray 3 is mounted above the hollow mounting rack 1 and fixed via reinforcing ribs, the electromagnetic chuck 4 is embedded into the tray 3, the electric cylinder 2 is fixed inside the hollow mounting rack 1, the output end of the electric cylinder 2 is connected with the piston 6, the piston 6 is matched with the inner wall of the sleeve 5, the outer wall of the sleeve 5 is in tight fit with the hollow mounting rack 1, the tray 3 and the electromagnetic chuck 4, the upper end face of the sleeve 5 is connected with the electromagnetic chuck 4 via screws, and the sleeve 5 is thus fixed. The lower end of the support column 8 is fixed on the sleeve 5, the upper end of the support column 8 is fixed on the end cover 9, the space formed by the end cover 9 and the sleeve 5 is sealed by the soft rubber cover 7, and the medium in the sleeve 5 is air.

When the electric cylinder 2 propels the piston 6 to move up, the closed space in the sleeve 5 is reduced, the soft rubber cover 7 is expanded by air extrusion, and the expanded soft rubber cover 7 is in tight fit with the inner wall of a center hole of a wheel to protect the center hole; when the electric cylinder 2 propels the piston 6 to move down, the closed space in the sleeve 5 is enlarged, and the soft rubber cover 7 can contract, leave the inner wall of the center hole and restore to the initial state. Compared with a method of protecting the center hole by an expansion sleeve, this protection method is large in protection range and strong in universality and greatly reduces the manufacturing cost.

The upper end of the spring 11 is fixed on the high temperature resistant plastic protective plug 10, and the lower end is free. During protection, the lower end face of the spring 11 is in contact with the bottom surface of a bolt hole counter bore of the wheel, and when the conical surface of the high temperature resistant plastic protective plug 10 is fitted with the conical surface of a bolt hole, the spring 11 is in a compressed state. The iron post 12 is fixed at the lower end of the high temperature resistant plastic protective plug 10.

The using method of the wheel spraying protection device is: firstly, a wheel is put on the device, the electric cylinder 2 is started to drive the piston 6 to move up, the soft rubber cover 7 is expanded to protect the center hole of the wheel; then, the electromagnetic chuck 4 is powered on, the high temperature resistant plastic protective plug 10 is put into a bolt hole and pressed with certain strength, and when the conical surface of the high temperature resistant plastic protective plug 10 is in tight fit with the conical surface of the bolt hole, the spring 11 is in a compressed state; due to the suction of the electromagnetic chuck 4, the iron post 12 is in tight fit with the electromagnetic chuck 4; after all the high temperature resistant plastic protective plugs 10 are put into the bolt holes, the wheel is firmly fixed on the electromagnetic chuck 4, at the moment, not only is the flange face of the wheel completely fitted with the plane of the electromagnetic chuck 4, but also the conical surfaces of the high temperature resistant plastic protective plugs 10 are in tight fit with the bolt hole conical surfaces, so that the flange face and the bolt holes conical surfaces are protected. This protection method can fulfill the purpose of tight fit, and can also solve the problem that the wheel slightly shakes and moves. After the wheel is sprayed, the soft rubber cover 7 is contacted and restored, the electromagnetic chuck 4 is powered off, and the high temperature resistant plastic protective plugs 10 are easily taken out of the bolt holes under the action of elasticity of the springs 11, thereby solving the problem that the protective plugs are unlikely to take out due to paint adhesion.

The disclosure can play a role in protecting during the wheel spraying process, and solves the problem that the flange face, the center hole and the bolt hole conical surfaces are adhered with paint. The device has the characteristics of advanced process, easiness in manufacturing, simple structure, strong function and the like.

The invention claimed is:

1. A wheel spraying protection device, being composed of a hollow mounting rack, an electric cylinder, a tray, an electromagnetic chuck, a sleeve, a piston, a soft rubber cover, a support column, an end cover, high temperature resistant plastic protective plugs, springs and iron posts, wherein the tray is mounted above the hollow mounting rack, the electromagnetic chuck is embedded into the tray, the electric cylinder is fixed inside the hollow mounting rack, an output end of the electric cylinder is connected with the piston, the piston is matched with an inner wall of the sleeve, an outer wall of the sleeve is fit with the hollow mounting rack, the tray and the electromagnetic chuck, an upper end face of the sleeve is connected with the electromagnetic chuck via screws, a lower end of the support column is fixed on the sleeve, an upper end of the support column is fixed on the end cover, a space formed by the end cover and the sleeve is sealed by the soft rubber cover, and a medium in the sleeve is air;

when the electric cylinder drives the piston to move up, the space formed by the end cover and the sleeve is reduced, the soft rubber cover is expanded by air extrusion, and the expanded soft rubber cover is fit with an inner wall of a center hole of a wheel to protect the center hole; when the electromagnetic chuck is powered on, the iron posts are fit with the electromagnetic chuck, the wheel is fixed on the electromagnetic chuck, not only is a flange face of the wheel completely fitted with a plane of the electromagnetic chuck, but also conical surfaces of the high temperature resistant plastic protective plugs are fit with bolt hole conical surfaces, so that the flange face and the bolt hole conical surfaces are protected.

* * * * *